Nov. 10, 1970     F. A. CIAMPA ET AL     3,538,573
MACHINE FOR ASSEMBLING BOX SPRINGS
Filed June 7, 1968                          9 Sheets-Sheet 1
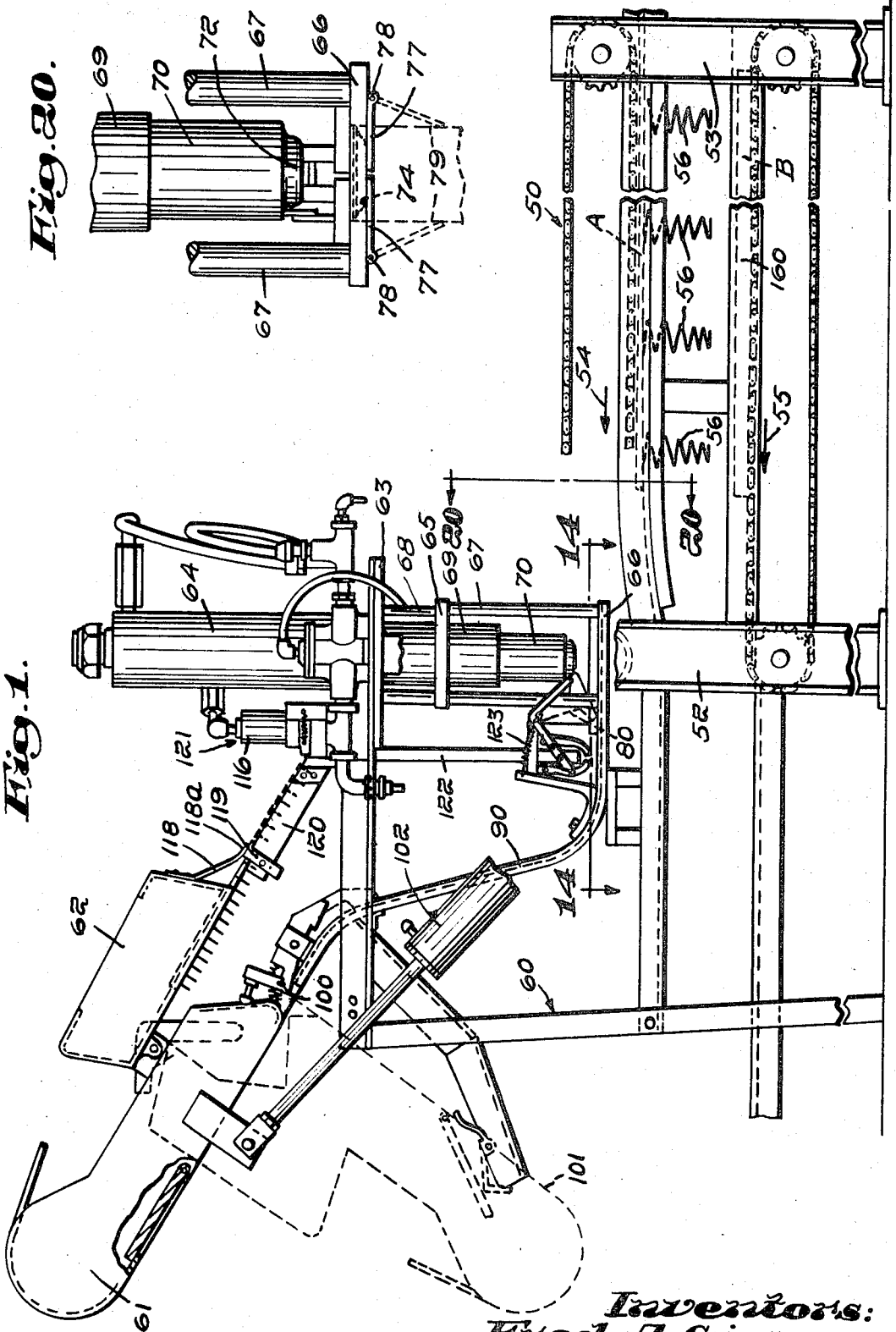
Inventors:
Fred A. Ciampa,
Angelo Serafini,
Louis Mazzarella
by Thomson & Mrose Attorneys

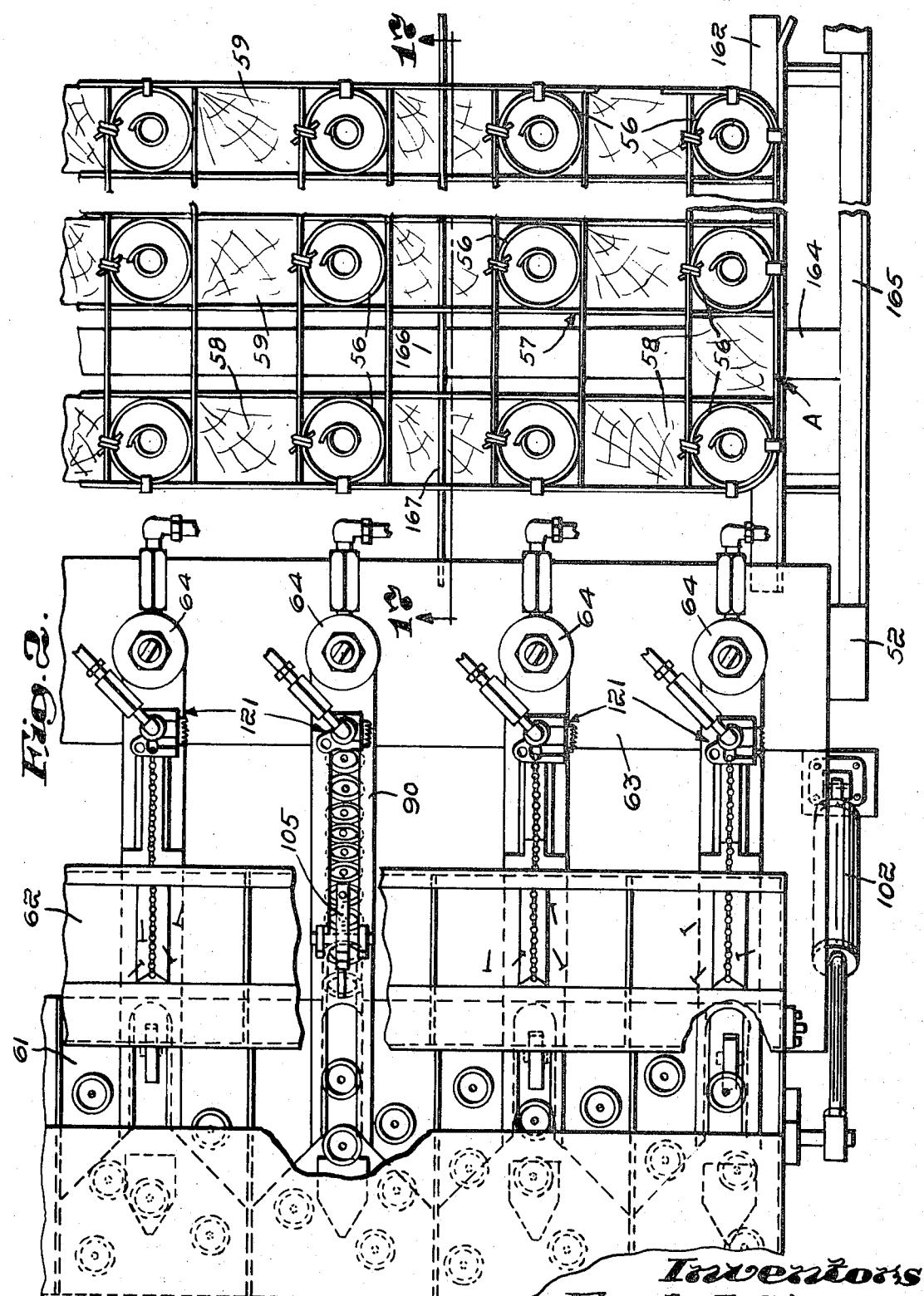

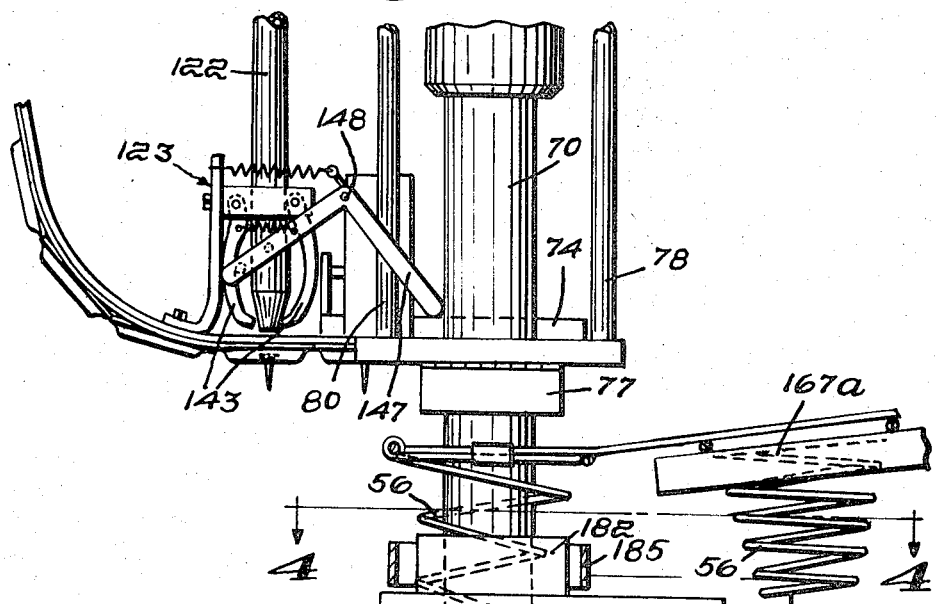
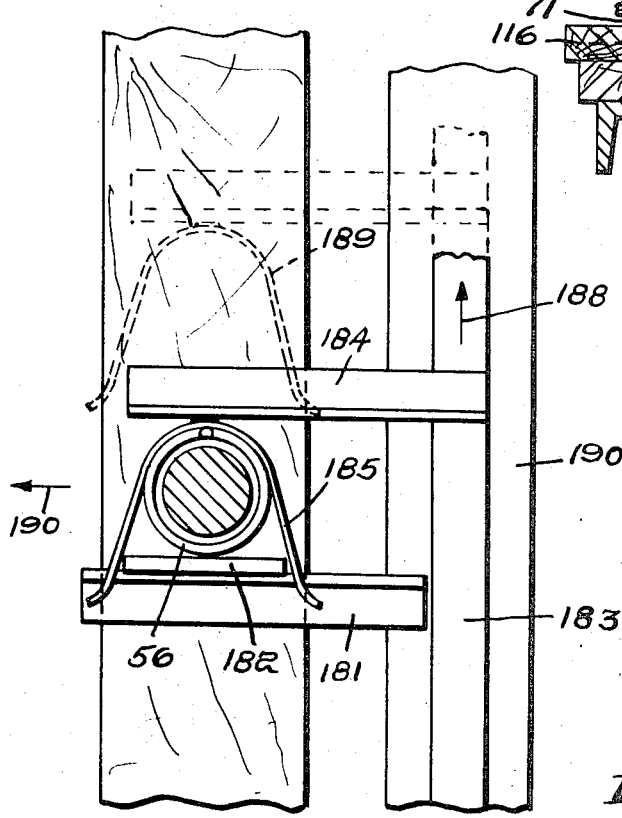

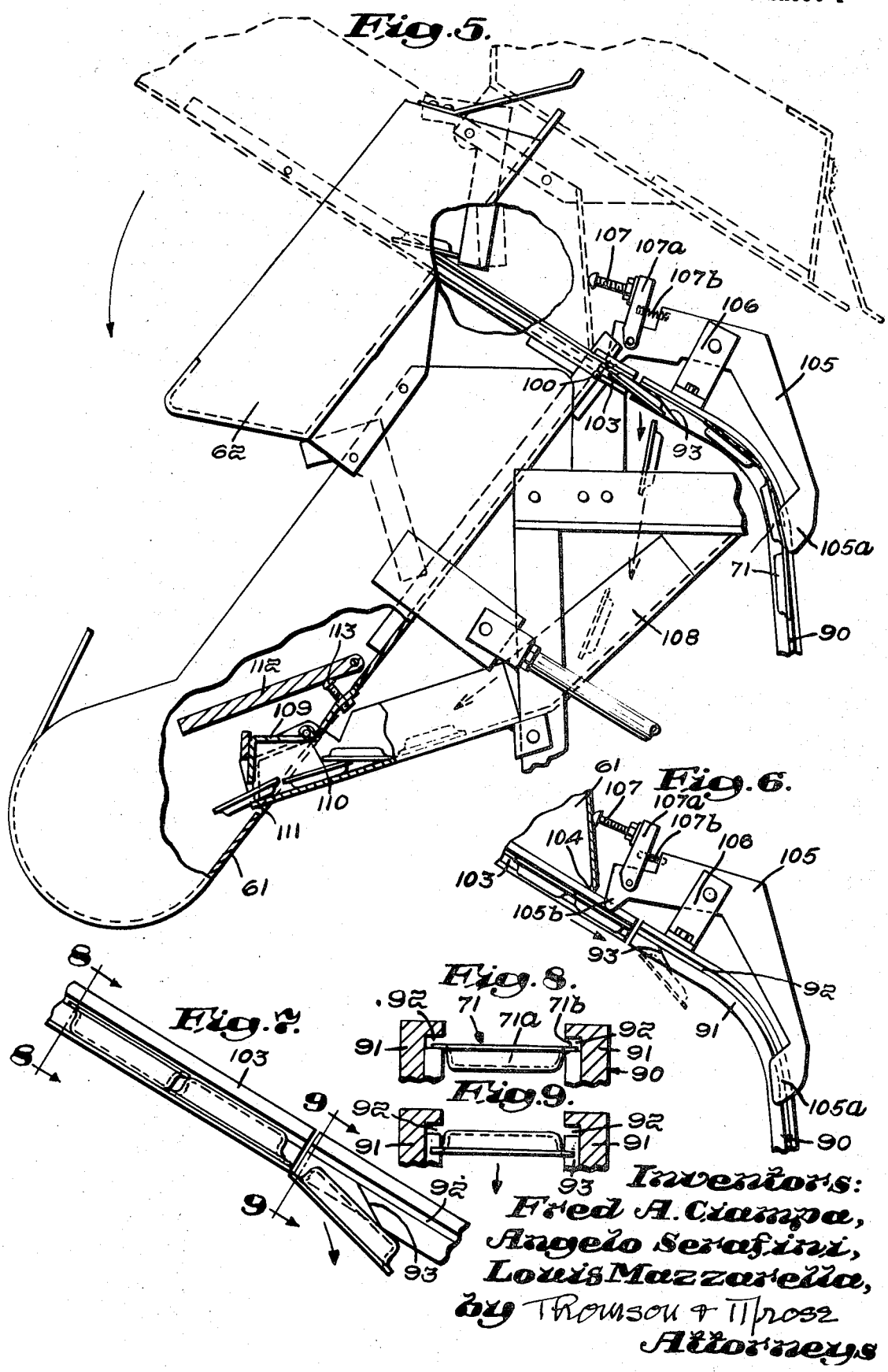

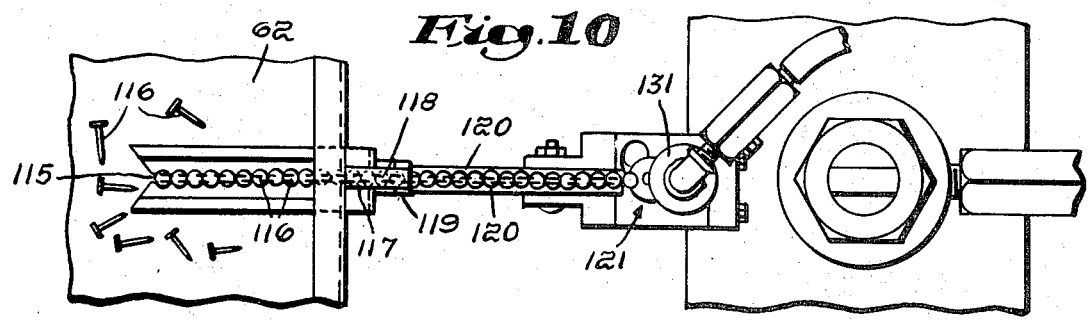
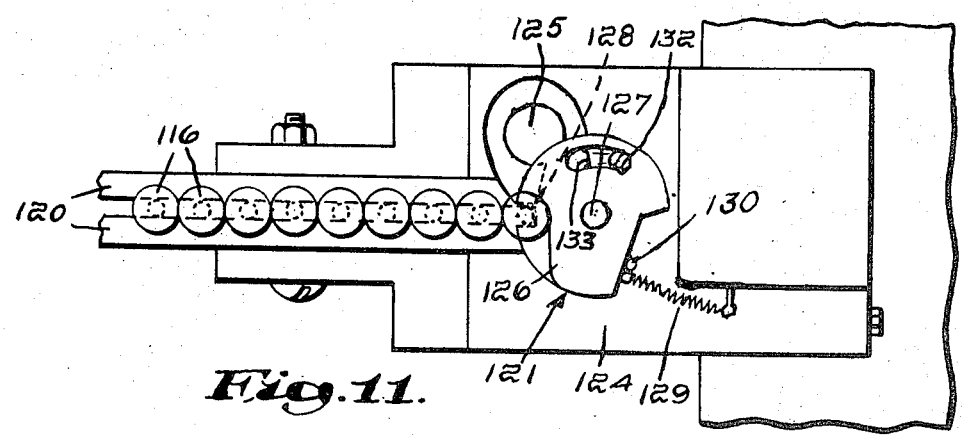
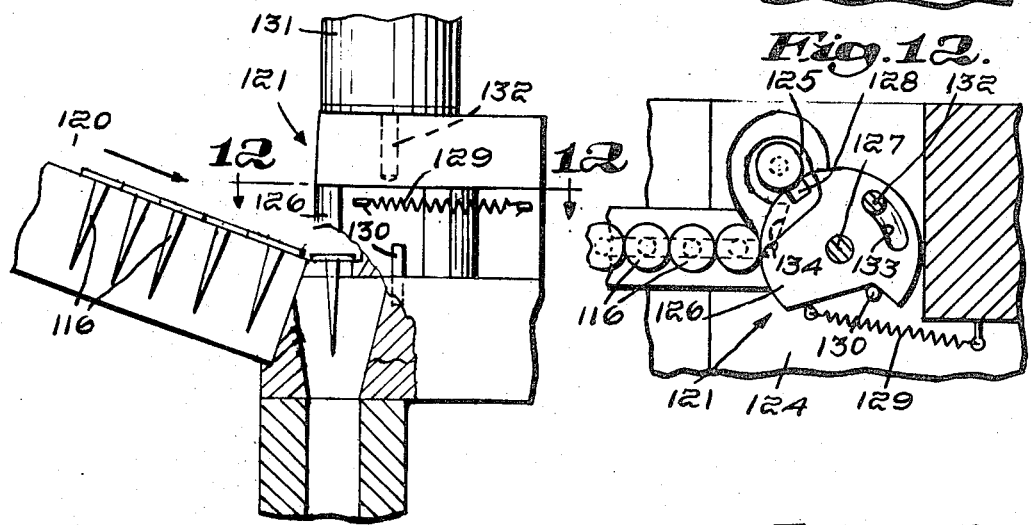

Nov. 10, 1970  F. A. CIAMPA ET AL  3,538,573
MACHINE FOR ASSEMBLING BOX SPRINGS
Filed June 7, 1968  9 Sheets-Sheet 6
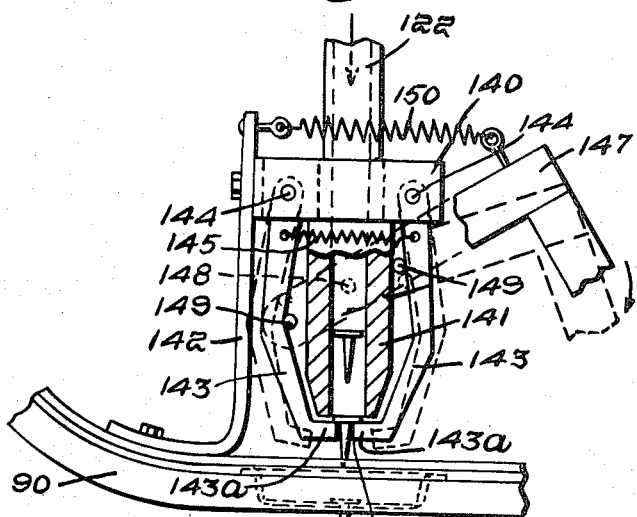
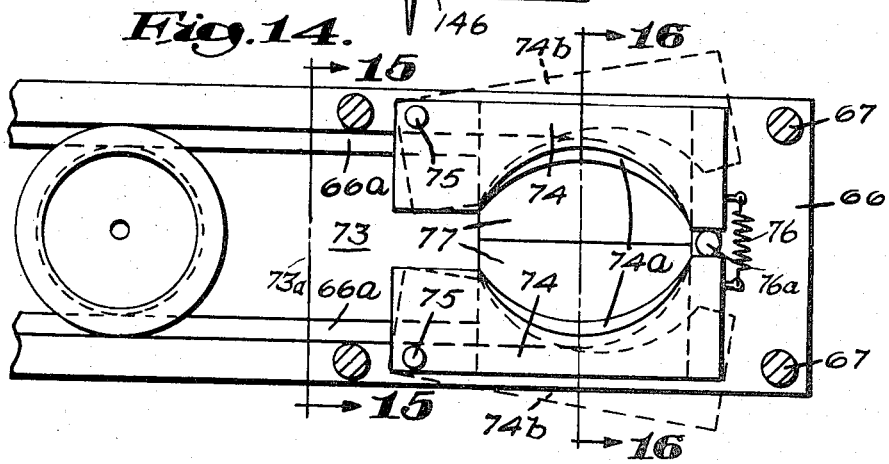
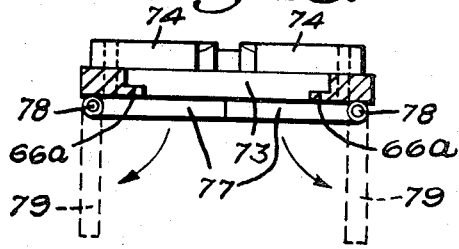
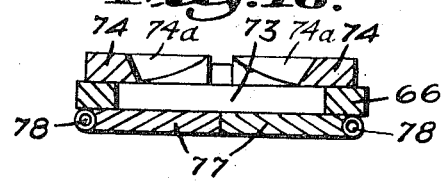
Inventors:
Fred A. Ciampa,
Angelo Serafini,
Louis Mazzarella,
by Thompson & Mrose
Attorneys

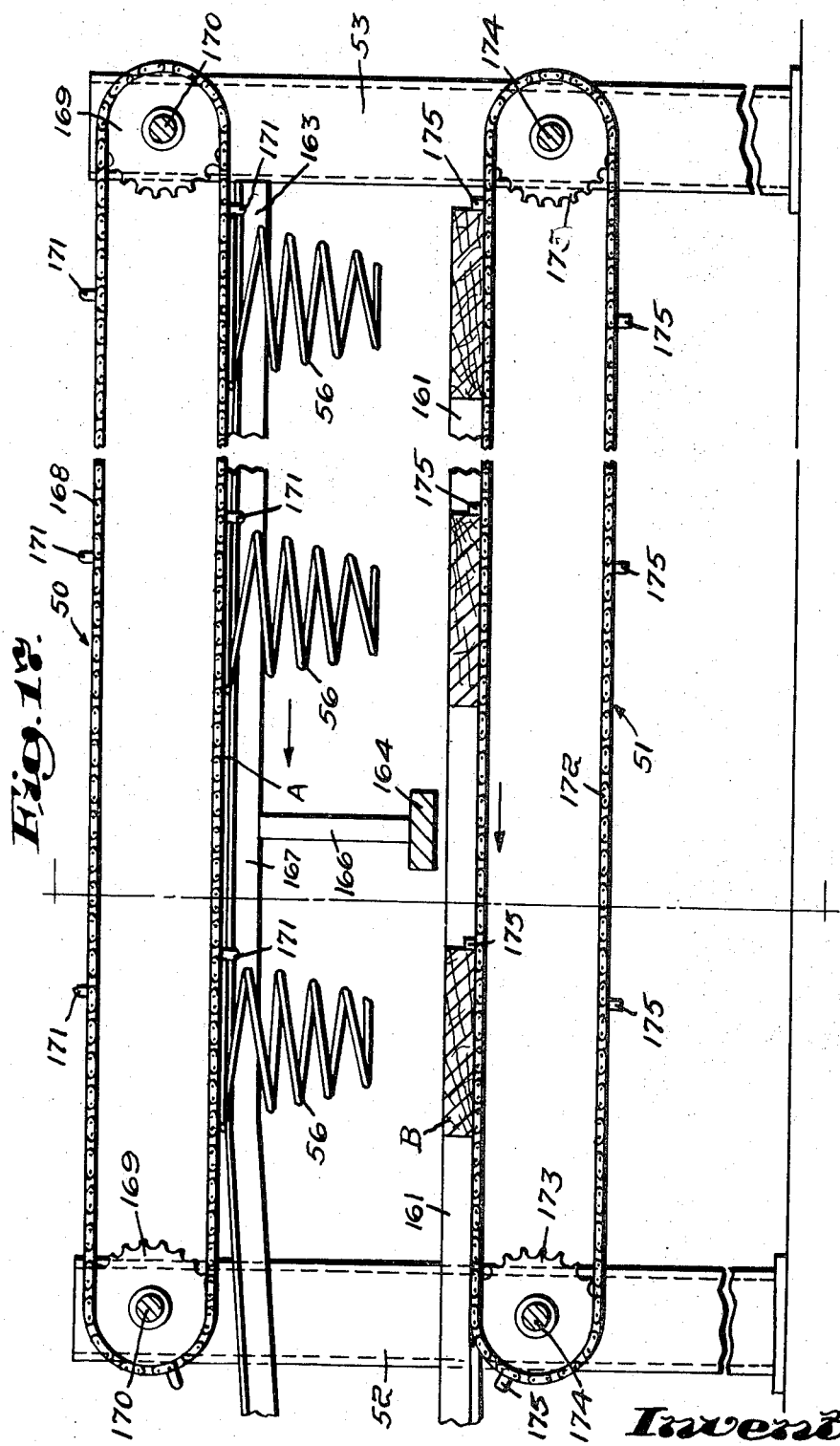

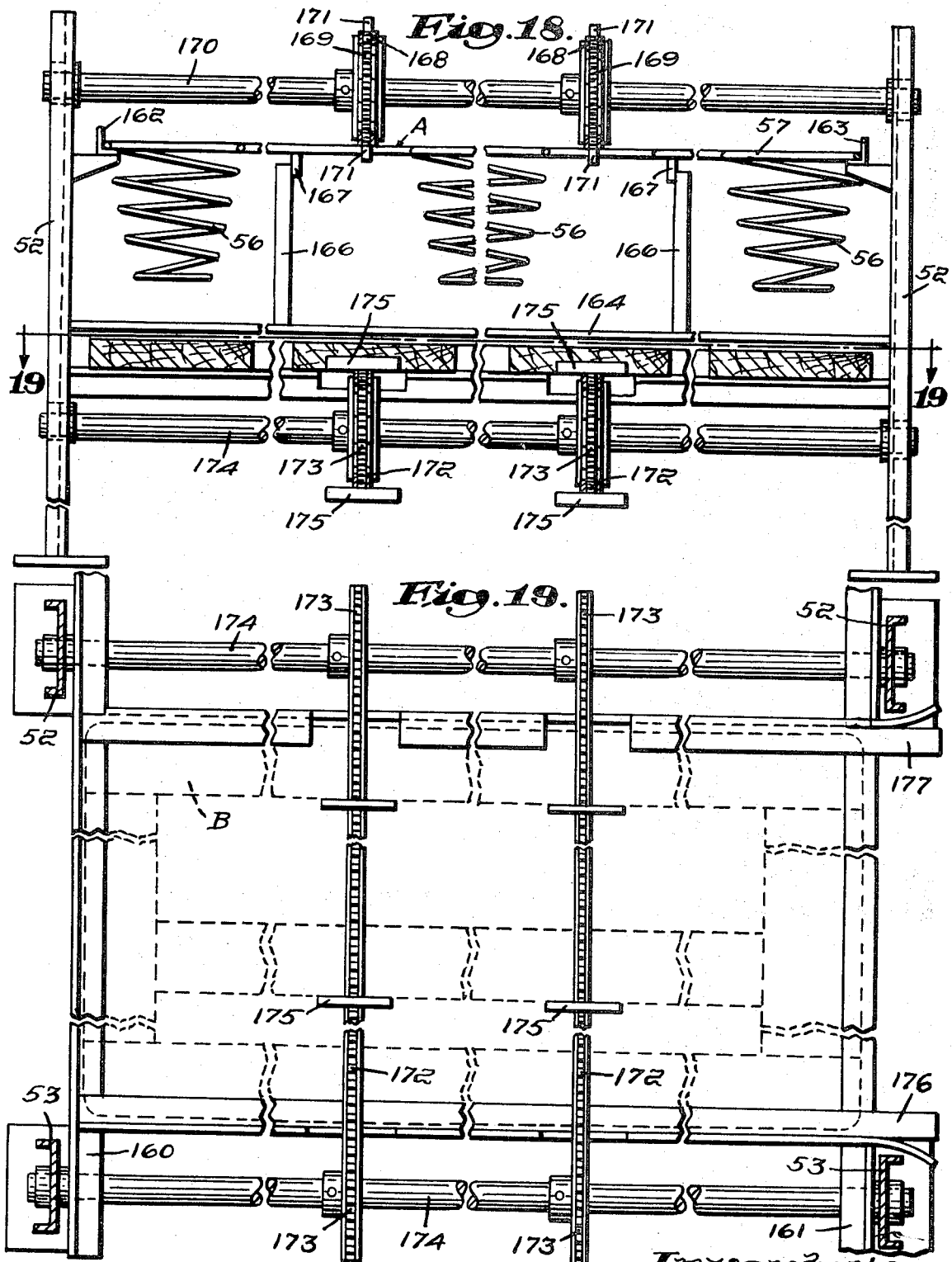

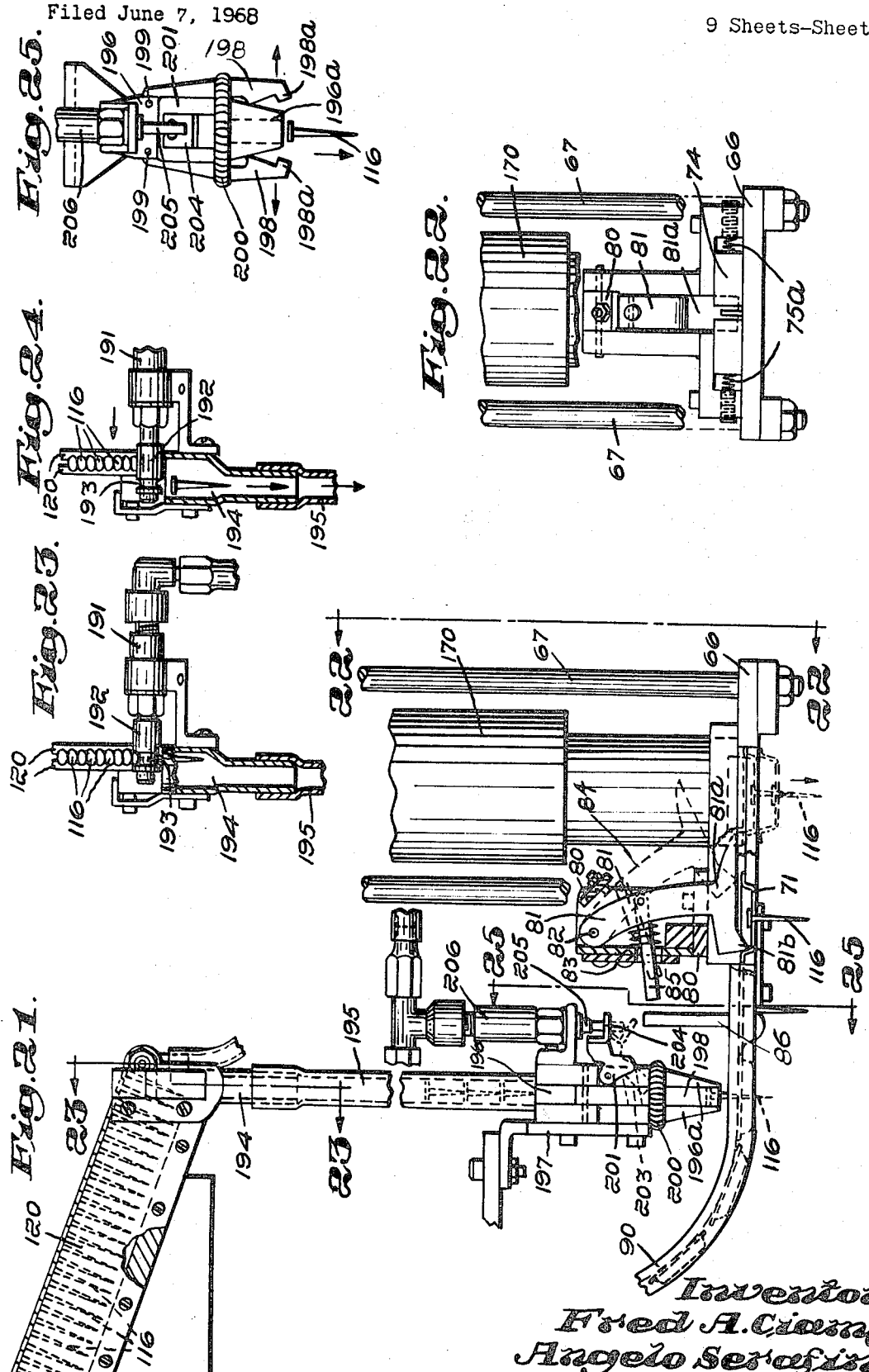

United States Patent Office 3,538,573
Patented Nov. 10, 1970

3,538,573
MACHINE FOR ASSEMBLING BOX SPRINGS
Fred A. Ciampa, Angelo Serafini, and Louis Mazzarella, Boston, Mass., assignors to Standard Box Spring Co., East Boston, Mass., a corporation of Massachusetts
Filed June 7, 1968, Ser. No. 735,373
Int. Cl. B68g 7/00
U.S. Cl. 29—91                    16 Claims

ABSTRACT OF THE DISCLOSURE

A machine for fastening box spring coils to the wood bottom frame of a box spring, by means of flanged disks which engage over the bottom turns of the coils and are secured to the frame by tacks. The machine has a row of attaching mechanisms, each including a disk feed mechanism, a tack feed mechanism which drops tacks singly through holes in the disks, and a plunger which drives a disk and tack through a coil into the frame. The attaching mechanisms operate simultaneously to fasten a row of coils. A first step conveyor advances the frame, and a second step conveyor advances a pre-assembled top and coil spring assembly into the row of attaching mechanisms.

BACKGROUND OF THE INVENTION

This invention relates to the assembly of box springs onto a wooden bottom frame, and more particularly to a machine for automatically securing the coils of a box spring to a bottom frame by means of the disk and tack type of fastener shown in our co-pending application Ser. No. 632,965, filed Apr. 24, 1967.

The principal object of this invention is to provide a machine which will attach the coils of a box spring assembly to the bottom frame automatically, with a minimum of attention from the operator. Another object is to provide a machine which will attach an entire row of coils at one time. Other objects, advantages and novel features will be apparent from the following description.

SUMMARY

The machine here disclosed has a bank of driving heads corresponding in number to the number of coils in a row in the particular type of spring which the machine is designed to assemble. Each head consists of a plunger mounted to reciprocate vertically in a stationary frame and driven by a pneumatic cylinder. The plunger carries a permanent magnet on its lower end, and the magnet is contoured to fit into the attaching disks. Associated with each plunger is a feed for the disks, consisting of a track leading from a feed hopper to a gate assembly disposed under the plunger. A feed mechanism for tacks is also provided for each plunger. This mechanism consists of a track along which the tacks are fed in a row and a release device which drops tacks one at a time into the disks on the disk feed track. A positioning device engages the coils under each plunger before the plunger enters the coil. On its down stroke, the plunger engages a disk, which has previously been supplied with a tack and positioned in the gate assembly, the gate opens, and the plunger passes downward through a coil and drives the tack into a wooden member of the bottom frame which is positioned on an anvil under the plunger. During the return stroke of the plunger another disk is positioned in the gate. Between strokes, a pair of conveyors advances a pre-assembled top construction carrying the coils, and the corresponding bottom frame, to bring the next row of coils and the corresponding frame member into position under the driving heads.

BRIEF DESCRIPTION OF THE DRAWINGS

In the drawings illustrating the invention:
FIG. 1 is a side elevation of a coil attaching machine constructed according to the invention with details of the conveyors omitted for clarity;
FIG. 2 is a plan view of the machine partly broken away, and with the conveyors omitted, showing a typical top mat and spring assembly and bottom frame about to enter under the driving heads;
FIG. 3 is an enlarged fragmentary elevation taken in the region of a plunger showing the latter in its extreme downward position;
FIG. 4 is a fragmentary cross-section taken along line 4—4 of FIG. 3.
FIG. 5 is an enlarged fragmentary elevation, partly in cross-section, taken in the region of the upper part of the disk feed mechanism;
FIG. 6 is a detail of the lever which controls the feed of disks to the track;
FIGS. 7, 8 and 9 are details of the reject mechanism for ejecting disks which enter the track upside down;
FIG. 10 is a fragmentary plan view of the tack feeding mechanism;
FIG. 10a is an enlarge fragmentary plan view in the region of the tack pick-off mechanism;
FIG. 11 is a side elevation of the tack pick-off mechanism of FIG. 10a;
FIG. 12 is a fragmentary cross-section taken along line 12—12 of FIG. 11;
FIG. 13 is a fragmentary enlarged elevation, partly in cross-section taken in the region of the tack delivery mechanism, associated with the tack feed;
FIG. 14 is an enlarged fragmentary cross-section taken along line 14—14 of FIG. 1;
FIG. 15 is a cross-section taken along line 15—15 of FIG. 14;
FIG. 16 is a cross-section taken along line 16—16 of FIG. 14;
FIG. 17 is a cross-section partly broken away, taken along line 17—17 of FIG. 2, illustrating the conveyors and supports for the spring assembly and bottom frame;
FIG. 18 is a cross-section, partly broken away, taken along line 18—18 of FIG. 17;
FIG. 19 is a cross-section, partly broken away, taken along line 19—19 of FIG. 18;
FIG. 20 is an enlarged fragmentary elevation taken along line 20—20 of FIG. 1;
FIG. 21 is a fragmentary side elevation, taken in the region of one of the driving heads, illustrating a modified form of tack feed mechanism;
FIG. 22 is a fragmentary end view taken along line 22—22 of FIG. 21;
FIG. 23 is a fragmentary cross-section taken along line 23—23 of FIG. 21;
FIG. 24 is a cross-section similar to FIG. 23 showing the tack pick-off mechanism in operating position; and
FIG. 25 is a fragmentary cross-section taken along line 25—25 of FIG. 21 showing the tack dropping mechanism in the process of releasing a tack.

DETAILED DESCRIPTION OF THE PREFERRED EMBODIMENT

As shown in FIG. 1, an upper conveyor generally indicated by the numeral 50, and lower conveyor generally indicated by the numeral 51, are supported on posts 52 and 53. Both conveyors are driven together in the direction of arrows 54 and 55 in a step-by-step motion by any suitable mechanism (not shown). The upper conveyor supports a spring assembly generally indicated by A, consisting of transverse and longitudinal rows of coils 56, secured together by a prefabricated wire mat 57 of the type shown in our Pat. No. 3,270,354, consisting of longitudinal and transverse wires welded together at their intersections, and to a border wire. The lower conveyor carries a wood bottom frame of the usual type, generally indicated by B, consisting of a rectangular border 58 and cross pieces 59, to which each transverse row of coils 56 is to be fastened.

A suitable framework, generally indicated by the numeral 60, attached to posts 52 supports the feed hoppers 61 and 62 for the disks and tacks, a cross plate 63 for supporting the driving heads, and certain other working parts of the machine. A typical driving head is operated by an air cylinder 64, mounted on plate 63. A cage consisting of plates 65 and 66 connected by rods 67, is suspended by additional rods 68 from plate 63. A sleeve 69 is mounted in plate 65 and serves as a guide for the plunger 70 which is driven by the air cylinder.

A typical disk 71, as best seen in FIG. 8, has a recessed center portion 71a and a flange 71b. When the disk is in place on a coil, the center portion fits inside the bottom turn of the coil and the flange overlies the bottom turn. As shown in FIG. 20, the plunger 70 carries a circular permanent magnet 72 on its lower end. This magnet is of appropriate diameter to fit into the recessed center portion of the disk.

As best seen in FIG. 15, plate 66 has a horseshoe-shaped opening 73 communicating at its left hand end 73a with the track which feeds the disks, as will be later described, and terminating under the plunger. Immediately above this opening is a pair of gates 74 which rest on plate 66 and are rotatable on pivots 75. The gates 74 are urged into closed position by a spring 76 and engage a stop pin 76a at their right hand ends. The gates have downwardly sloping cam surfaces 74a which are engaged by the plunger on its downward stroke, and cause the gates to be swung open to the position shown by the dotted outline 74b. Below the right hand portion of opening 73 is a pair of horizontally hinged flaps 77, mounted on spring hinges 78 which tend to keep them closed. Along the left hand portion of opening 73, plate 66 carries flanges 66a which supports the flanges of entering disks and terminate at flaps 77.

A disk 71 which is positioned in the right hand end of opening 73 under the plunger is retained between gates 74 and flaps 77. When the plunger moves down, picking up the disk on its way, gates 74 open outwardly, as shown in FIG. 14, and flaps 77 are swung down to the positions shown in dotted outlines 79 in FIG. 15, allowing the plunger and disk to pass through.

A block assembly 80, mounted on plate 66, supports a disk positioning mechanism best seen in FIGS. 21 and 22. An arm 81, having a sloping foot portion 81a extending toward the plunger, and a rearwardly extending dog portion 81b, is pivotted at 82 in block 80. Arm 81 is normally urged by a spring 83 into the position indicated by the dotted outline 84 in FIG. 21. As the plunger travels downward, it engages foot portion 81a and pushes the arm back, causing dog portion 81b to engage inside the disk 71 which is nearest the disk immediately under the plunger. Movement of arm 81 is limited by a stud 85, on the arm, which engages a fixed stop 86. The disk which is engaged by the arm 81 is thus moved back to a predetermined position on the track, causing one of the following disks on the track to be accurately positioned under the tack release mechanism, which drops a tack during each cycle of the plunger, as will be later described.

The track 90 slopes downward and flattens out to connect with plate 66. As best seen in FIGS. 8 and 9, the track consists of a pair of spaced rails 91 having internal grooves 92 in which the flanges 71b of the disks slide. The disks pass down the track under gravity. At the upper end of the track is a reject device, shown in FIGS. 7, 8 and 9, which prevents disks from entering upside down. The under parts of the rails are cut away, forming downwardly sloping surfaces 93. When a disk enters upside down, its flange engages these surfaces, as shown in FIG. 9, and the disk will be deflected downward and dropped out of the track as shown in FIG. 7. If the disk enters right side up, its flange will pass into the groove as shown in FIG. 8.

The hopper 61 from which the disks are supplied is pivoted at 100 and swung periodically, between the position shown in full line in FIG. 1 and the position shown by the dotted outline 101, by means of an air cylinder 102 and suitable linkage (not shown in detail). The hopper 61 carries with it the tack hopper 62 which is attached to it. Movement of the hoppers agitates both the disks and the tacks. Preferably, the cylinder 102 is operated in synchronization with the plungers 70.

Mounted in the forward part of hopper 61 in a section of track 103 similar to track 90, which passes out through an opening 104 (FIG. 6). This section of track connects with the upper end of track 90 when the hopper is in raised position. Disks which slide into track section 103 as the result of agitation of the loose disks in the hopper are placed in position to slide into track 90. A lever 105 is pivoted on a bracket 106 mounted near the upper end of track 90. When hopper 61 is in raised position, it engages a stud 107 mounted on an arm 107a pivoted on lever 105. The arm is backed up by a spring 107b. When the track 90 is full, as illustrated in FIG. 5, the lower end 105a of the lever engages one of the disks in the track and prevents the lever from tilting clockwise. Spring 107b yields, permitting arm 107a to tilt clockwise. A dog portion 105b at the upper end of the lever engages track section 103, when the lever is in this position, and prevents disks from sliding out of the hopper. When the upper part of track 90 is empty, as illustrated in FIG. 6, the lever 105 can be swung clockwise by the pressure of spring 107b, and dog portion 105b is raised, so that disks in track section 103 can pass under it.

As previously explained, disks which enter the upper end of track 90 upside down are ejected through slot 93. A chute 108 is mounted below the track to catch disks which fall out. At the lower end of this chute is a gate 109, spring hinged at 110 to normally remain closed. The hopper 61 has an opening 111 normally closed by a spring hinged gate 112. When the hopper is in the down position, as illustrated in FIG. 5, the lower end of chute 108 enters opening 111, pushing open gate 112. At the same time, gate 112 engages a stud 113 on gate 109 and opens the latter so that disks in the chute can slide back into the hopper.

The tack hopper 62 has a slot 115 (FIG. 10) in its forward portion. The slot is wide enough to admit the shanks of the tacks 116, but not the heads, so that tacks align themselves in the slot with their shanks hanging down. A short piece of similarly slotted track section 117 extends through an opening in the forward end of hopper 62. A leaf spring 118 has a flat lower end portion 118a (FIG. 1) which normally engages the end of track section 117 and prevents tacks from sliding out. When the hoppers are in raised position, end portion 118a is engaged by a bridge 119 on a pair of tack feed rails 120 and raised so that tacks can slide between the latter. The rails are spaced apart by the width of a tack shanks, with enough clearance so that the tacks slide freely along the rails.

The tack feed rails 120 lead to a tack pick-off mechanism, generally indicated by the numeral 121, which removes a tack from the track on each stroke of the plunger 70 and drops the tack through a tube 122 (FIG. 1) to a tack setting mechanism, generally indicated by the numeral 123. The tack pick-off mechanism is illustrated in detail in FIGS. 10, 11, and 12. A base block 124 is secured to the lower ends of rails 120 and has an opening 125 offset from the ends of the rails and leading to the interior of tube 122. A cam 126 is rotatably mounted on shaft 127 in block 124. The cam has a notch 128, and is restrained by a spring 129 against a stop 130, in such a position that notch 128 is aligned with the opening between rails 120. An air cylinder 131 is mounted on block 124 with its axis offset from shaft 127, and drives a piston rod 132 which engages a spiral groove 133 in cam 126. When the piston rod moves down, it causes cam 126 to rotate clockwise, carrying a tack in notch 128 toward opening 125. As the cam turns, the shank of the tack engages a fixed cam surface 134 in block 124, which pushes the tack out of notch 128 and causes it to drop freely into opening 125.

The tack setting mechanism is illustrated in detail in FIGS. 3 and 13. A collar 140 fits around the lower end of tube 122 and carries a short extension tube 141 of the same internal diameter. The collar is supported by a bracket 142 mounted on the disk feed track 90. Jaws 143 are pivoted at 144 on collar 140 and pulled toward each other by a spring 145. The jaws have foot portions 143a which overlap the bottom of tube 141 leaving a gap 146 which is wide enough to admit the shank of a tack, but narrower than the head. A tack which drops down tube 141 is supported shank down by jaw portions 143a.

A lever 147 is pivoted at 148 on tube 141 and carries pins 149 which engage inside jaws 143. This lever is normally urged counterclockwise by a spring 150. When plunger 70 moves downward, it engages the right hand end of lever 148, causing the lever to rotate clockwise. Pins 149 spread jaws 143 apart so that the tack can drop into the disk which has been positioned by the action of the positioning lever 81, as previously explained.

The conveyor and support assembly for the frame and spring is illustrated in FIGS. 17, 18, and 19. Supported on the pairs of posts 52 and 53 on opposite sides of the machine are angular rails 160 and 161 which support and guide the wood frame A, and similar rails 162 and 163 which support and guide the spring assembly. A pair of transverse plates 164 is supported on angles 165 attached to posts 52 and 53 outside the rails. The transverse plates carry posts 166 which support a pair of bars 167 running longitudinally in the conveyor region of the machine. As shown in FIG. 18, posts 166 and bars 167 are spaced to pass between the coils 56 of a spring assembly. Rails 162 and 163 support the top wire assembly 57 of the spring at the edges, and bars 167 support the assembly at intermediate points. The wooden frame B passes under plates 164.

The upper conveyor 50 consists of a pair of chains 168 driven by sprockets 169 which are mounted on shafts 170 supported on posts 52 and 53. Chains 168 carry dogs 171 which engage the cross wires of the top wire assembly 57 and drive the spring assembly forward. The lower conveyor 51 consists of a pair of chains 172 driven by sprockets 173 mounted on shafts 174 which are supported on posts 52 and 53. Chains 172 carry cross plates 175 which engage behind the cross members 58 of the wood frame B to drive it forward. The conveyors are driven in unison with a step motion. The drive and linking mechanism for doing this is not shown as such devices are well known. Each step advances the spring assembly and the wood frame by a distance equal to the spacing on centers between adjacent transverse rows of coils 56.

The spring assembly A is inserted through the right hand end of the machine. The frame B is inserted from the side. As shown in FIG. 19, a pair of transverse angles 176 and 177 is mounted on angles 160 and 161. The upstanding flange of angle 161 is cut off between angles 176 and 177 to allow the frame B to be slid in. The upstanding flange of angle 177 is cut off between angles 160 and 161 to allow the frame to move forward after it has been put in position. The spring assembly and frame are held in alignment sidewise by their guide rails 160, 161, and 162, 163. The frame is initially positioned by angle 176. The spring is aligned approximately over the frame by the operator. If the spring and frame are not exactly aligned in the drive direction, the conveyor drive dogs, or drive plates will engage the lagging spring or frame; as the case may be, first, and bring it into alignment with the other member.

The bottoms of the coils 56 are spaced from the frame so that they pass over the transverse plates 164. As illustrated in FIG. 3, the bars 167 have downwardly sloping end portions 167a extending toward the region of the driving heads. The guide rails 162 and 163 likewise slope downward in this region. Mounted adjacent to the driving head is another transverse plate 180, carrying an angle 181 which extends past the adjacent driving head to one side of the plunger. An upright plate 182 is attached to angle 181. A bar 183 is mounted to slide transversely of the machine on plate 180, and carries an angle 184 which extends past the adjacent driving head and carries a horseshoe-shaped coil grip member 185.

When the conveyors have advanced a transverse row of coils 56, and the corresponding cross piece 58 of the wood frame, under the driving heads, and stopped, bar 183 is moved to carry member 185 to the position shown in full line in FIG. 4. The coil 56 is gripped between member 185 and plate 182 and held in position, while the plunger 70 drives a disk and tack through the coil.

An anvil 186 is mounted under the plungers on a transverse beam 187 supported on the framework of the machine. On the downstroke of the plunger 70, the disk 71 which it carries engages the bottom turn of the coil which is in position under the plunger, stretching the coil somewhat, and drives the tack 116 through the frame member 58. The lower end of the tack is clinched over by the anvil 186. As the plunger is withdrawn, bar 184 is moved in the direction indicated by arrow 188, carrying member 185 to the position shown by the dotted outline 189. The coil which has just been attached to the wood frame member is then free to move out of the driving head region in the direction of arrow 190 on the next advance of the conveyor. It is understood that a coil gripping device such as that illustrated in FIGS. 3 and 4 is provided at each driving station, and the members 185 are all moved simultaneously by bar 183, which is driven back and forth by any suitable device (not shown) such as an air cylinder. The assembled spring and frame, as they emerge from the driving heads, are supported on a suitable bed or table (not shown).

OPERATION OF THE MACHINE

The cycle of operation of the machine is as follows:

The conveyors advance one step and stop. The plungers 70 move down, actuating the positioning arms 81 to position disks 71 on the respective disk tracks under the tack dropping mechanisms, associated with each driving station. The cylinders 121, which operate the tack pick-off mechanisms, are timed to drop a tack into the associated tube 122 of each station just as the disks come to rest, before the lever 147 opens the jaws 143 of the tack dropping mechanism. A tack drops into the latter, then is released to drop into the disk underneath. Before the plungers enter the coils 56 underneath, bar 183 is operated to bring the coil gripping members 185 into engagement with the coils. When a tack is held in gates 143, its point just enters the hole in the disk underneath so that the tack cannot fail to drop into the hole.

On the upstroke of the plungers, flaps 77 and gates 74 close, and arms 81 are released, so that the next disks 71, with tacks in place can slide into position under the plungers. Gates 143 of the tack dropping mechanism also close, and bar 183 is operated to retract gripping members 185 to a position clear of the coils.

The hoppers 61 and 62 may be swung upward on either the downstroke or the upstroke of the plungers, and may be operated less frequently than every cycle, as their only function is to keep the disk and tack tracks filled.

When the plungers have been withdrawn from the coils, the conveyor is advanced another step and the cycle is repeated. The system for timing the operation of the various devices is not shown, as systems suitable for the purpose are well known.

To make the machine ready for operation initially, it may be run through a few cycles "dry," until disks, supplied with tacks, are brought into place under the driving head. The machine is then stopped, and a spring assembly and bottom frame is inserted into the conveyor region. When assembly of one spring and frame has been completed, the machine is ready to receive the next.

MODIFIED TACK FEED

FIGS. 21 and 23 through 25 illustrate a modified form of tack feed. An air cylinder 191 operates a piston 192. The piston has a groove 193 which is in line with the opening between the tack rails 120 when the piston is retracted, and which received the end tack. When the piston is advanced, it closes the exit of the tack rails and drops a tack into a chute 194, as shown in FIG. 24.

The chute 194 is connected by a piece of flexible tubing 195 to a tack dropping device shown in FIGS. 21 and 25. A hollow body 196 is mounted on a bracket 197 supported on the framework of the machine and is split in its lower portion to form legs 196a. Jaws 198 are pivoted at 199 on body 196 and swing between legs 196a. The jaws carry projection 198a at the bottom which engage under the head of a tack dropped into the body 196. The jaws are urged inward by a circular spring 200 passing around the body and jaw assembly.

A rocker arm 201 is pivoted at 202 on body 196 and carries a pair of tapered fingers 203 which engage inside jaws 198. Arm 201 carries a tab 204 which is in the path of the piston 205 of an air cylinder 206. When the piston 205 moves down, arm 201 swings inward, and fingers 203 push jaws 198 apart, and shown in FIG. 25, allowing the tack to drop.

As in the case of the tack feed mechanism previously described, the tack dropping mechanism is empty during the parts of the cycle when disks are moving down the track into the disk gate and when arm 81 is being pushed back by the plunger 70. When arm 81 reaches the end of its clockwise stroke, which occurs shortly after the lower end of the plunger has passed through the disk gate, as shown in FIG. 21, the cylinder 191 is operated to advance piston 192 and drop a tack into chute 194. When the tack reaches the dropping mechanism, it is suspended in jaws 198.

The tack is momentarily held steady in the jaws with its point just entering the hole in the disk underneath. Shortly thereafter, cyclinder 206 is operated to rotate arm 201 and open jaws 198, and the tack is dropped into the disk. The essential features of the timing of the tack feed mechanism are that the tack pick-off should not operate until arm 81 has reached the end of its back, or clockwise, stroke and a disk is positioned at rest under the tack dropping mechanism and the tack should be dropped by the latter before arm 81 starts its return stroke and allows the disks to move forward.

It is understood that the machine may be used to attach disks of the type having an integral fastening prong. In that case, the tack feed is run empty.

This machine makes it possible to fasten a preassembled coil assembly to a bottom frame very rapidly, and requires no labor on the part of the operator except to remove a finished box spring and insert another frame and coil assembly. The coils are accurately positioned so that uniform assemblies are obtained. The cost of the spring is considerably reduced because of the reduced labor costs.

What is claimed is:

1. A machine, for attaching coils of a box spring to a bottom frame by means of disks having midportions with holes for receiving the shanks of tacks to secure the disks to the frame and raised flanges adapted to overlie the bottom turns of the coils, comprising: a supporting framework; a plunger reciprocable on said framework with an upstroke and a downstroke and adapted to drive a tack into said frame and secure a disk on its downstroke; means for inserting a tack in a disk prior to positioning it under said plunger; means for positioning a disk under said plunger; means for supporting a coil under said plunger; and means for supporting a frame member under said plunger.

2. A machine as described in claim 1, including a feed device for feeding a series of disks in succession to the disk positioning means.

3. A machine as described in claim 1, having conveyors for advancing a succession of coils and frame members under said plunger.

4. A machine as described in claim 1, said plunger having a magnetized lower end portion contoured to fit the midportions of said disks.

5. A machine as described in claim 1, the means for positioning a disk on the downstroke comprising a plate disposed in the path of said plunger and having an opening for said plunger to pass through, a pair of gates mounted on said plate and swingable sidewise, between an open and a closed position, said gates having sloping surface engageable by said plunger to swing the gates to open position, spring means urging said gates to closed position, a pair of flaps mounted on said plate under said opening and swingable downward to allow said plunger to pass through, and spring means urging said flaps upward against said plate.

6. A machine as described in claim 1, having a disk feed track comprising a pair of spaced rails having grooves in which the flanges of the disks are engageable, said track having an entrance at which said rails have downwardly sloping surfaces disposed to be below the flange of a disk entering right side up but above the flange of a disk entering upside down, said surfaces serving to direct an upside down disk downward out of the track.

7. A machine as described in claim 6 having a hopper with an exit opening for supplying disks to said track, said hopper being swingable between an up position, in which its exit opening communicates with said track entrance, and a down position, the machine having a disk return chute disposed under said track entrance, and said hopper having a return opening and a gate normally closing said return opening, said chute engaging and opening said gate when said hopper is in its down position.

8. A machine as described in claim 6, having a lever mounted on said track, said lever having a lower end engageable with a disk in said track and an upper end serving as a gate for said entrance, said lever being swingable, when said track is empty in the region of said lower end, to allow said upper end to move out of, and open, said entrance.

9. A machine, for attaching coils of a box spring to a bottom frame by means of disks having midportions and raised flanges, the midportions having holes for receiving the shanks of tacks to secure the disks to the frame and the disks having raised flanges adapted to overlie the bottom turns of the coils, said machine comprising: a supporting framework; a plunger reciprocable on said framework with an upstroke and a downstroke and adapted to drive a tack into said frame and secure a disk on its downstroke; means for positioning a disk under said plunger; means for supporting a coil under said plunger; means for supporting a frame member under said plunger; a disk track for feeding disks in a row to said disk positioning means; a tack track for holding tacks in a row with their shanks downward; a tack pick-off device for removing tacks singly from said tack track; and a tack dropping device connected to said tack pick-off device to receive tacks therefrom and disposed above said disk track, said tack dropping device having jaws for supporting a tack; and means for opening said jaws to drop a tack into the hole of a disk in said disk track.

10. A machine as described in claim 9, said tack pick-off device comprising a block having opening offset from said tack track and leading to said tack dropping device, a cam rotatable mounted on said block and having a tack receiving notch, and a reciprocating piston mounted on said block, said cam having a spiral cam surface engageable with said piston to rotate the cam and carry said notch from a position aligned with said tack track to a position aligned with said opening, said block having a surface engageable with the shank of a tack disposed in said notch and shaped to push the shank out of the notch as the notch approaches said opening.

11. A machine as described in claim 9, said tack pickoff mechanism comprising a block having an opening offset from said tack track and leading to said tack dropping device, and a piston having a groove adapted to receive the shank of a tack, and means for reciprocating said piston to carry said groove from a position aligned with said tack track to a position aligned with said opening.

12. A machine as described in claim 9, said tack dropping mechanism comprising a hollow body having oppositely disposed vertical slots, said jaws being pivoted on said body and movable in and out of said slots, and the means for opening said jaws comprising a lever pivotted on said body and having pins engaged inside said jaws, said lever having a portion engageable by said plunger to rotate the lever and open said jaws.

13. A machine as described in claim 9, said tack dropping mechanism comprising a body having a pair of spaced leg portions, said jaws being pivoted on said body and movable in and out between said leg portions, and a spring surrounding said jaws and leg portions and urging said jaws together, the means for opening said jaws comprising a lever pivotted on said body and having tapered fingers engagable inside said jaws, and a piston engaged with said lever and reciprocable to rotate said lever.

14. A machine as described in claim 9 having means for aligning a disk in said disk track under said tack dropping device comprising a lever pivotted adjacent said plunger said lever having a foot portion and a dog portion, a spring normally urging said lever, toward a position in which said foot portion is in the path of said plunger and said dog portion is above the disks in said track, said plunger on its downstroke engaging said foot portion and swinging said lever away from said position and causing said dog portion to engage one of the disks on said track, and a stop limiting the travel of said lever away from said position.

15. A machine, for attaching a spring assembly consisting of transverse rows of coils fastened to a mat having cross wires and border wires to a bottom frame having cross members, by means of disks having midportions adapted to be secured to the cross members and flanges adopted to overlie the bottom turns of the coils, comprising: a supporting framework, a bank of plungers mounted on said framework and reciprocable together between an up position and a down position; disk positioning means disposed in the path of each plunger between said positions; an upper pair of rails engageable with said border wires to support said spring assembly; a lower pair of rails engageable with said frame; a first conveyor adapted to advance successive transverse rows of coils under said plungers; and a second conveyor adapted to advance successive cross members of said frame under said plungers.

16. A machine as described in claim 15, said pairs of rails being disposed to support said spring assembly and frame in spaced relationship, and the machine having a coil positioning device comprising a transverse plate disposed between said assembly and frame, a number of fixed guides mounted on said plate each adapted to engage one side of a coil; a bar slidable transversely along said plate, and a number of horseshoe members mounted on said bar and movable therewith into and out of engagement with the other sides of said springs.

References Cited
UNITED STATES PATENTS

| | | | |
|---|---|---|---|
| 2,604,692 | 7/1952 | Broden | 29—208 |
| 3,045,714 | 7/1962 | Greeno et al. | 5—260 X |
| 3,099,837 | 8/1963 | Heilman et al. | |
| 3,122,829 | 3/1964 | Schaad et al. | 29—91.1 X |
| 3,323,155 | 6/1967 | Cooley et al. | 29—211 X |
| 3,414,915 | 12/1968 | Ciampa et al. | 5—263 X |
| 3,429,767 | 2/1969 | Bronstien et al. | 5—354 X |

JOHN F. CAMPBELL, Primary Examiner

V. A. DIPALMA, Assistant Examiner

U.S. Cl. X.R.

29—200, 211